United States Patent [19]

White et al.

[11] Patent Number: 4,901,642
[45] Date of Patent: Feb. 20, 1990

[54] CONSUMABLE WAFER IGNITER

[75] Inventors: C. Max White; James D. Rozanski, both of Brigham City, Utah

[73] Assignee: Morton Thiokol, Inc., Chicago, Ill.

[21] Appl. No.: 263,222

[22] Filed: Oct. 27, 1988

[51] Int. Cl.[4] .......................... F42C 19/08; F02K 9/95
[52] U.S. Cl. ........................................ 102/202; 60/256
[58] Field of Search .............. 102/202; 60/256, 39.823

[56] References Cited

U.S. PATENT DOCUMENTS

| 2,995,088 | 8/1961 | Asplund | 102/202 |
| 3,003,419 | 10/1961 | Fite, Jr. | 102/202 |
| 4,498,292 | 2/1985 | White | 102/202 |
| 4,503,773 | 3/1985 | Bolieau | 102/202 |
| 4,658,578 | 4/1987 | Shaw | 60/256 |

Primary Examiner—Charles T. Jordan
Attorney, Agent, or Firm—Gerald K. White

[57] ABSTRACT

An igniter for high-performance rocket motors having a full head-end web of propellant in the forward end of the motor includes a shallow cup-shaped fiberglass reinforced urethane container, dual rubber orifice arrangement in a plurality (12) of peripherally spaced exhaust ports, a shear key or lip for interlocking into the rocket motor propellant, and a saddle arrangement for initiator tube retention.

7 Claims, 2 Drawing Sheets

CONSUMABLE WAFER IGNITER

BACKGROUND OF THE INVENTION

1. Field of the Invention

The present invention relates to an improvement in igniters for solid fuel rocket motors. The improved igniter has particular application in high performance full head-end web rocket motors that do not accommodate a conventional head-end or aft-end case mounted igniter.

2. Description of the Prior Art

The conventional igniter for large solid fuel rocket motors is a miniature rocket motor that is known in the art as a "pyrogen" igniter. Typically, a pyrogen igniter is mounted in the forward end of a motor through a hole in the propellant. In some high-performance rocket motors, however, a pyrogen igniter is impractical because of the full head-end web of the propellant in the forward end of the motor. The head-end web propellant grain design is advantageous in that it provides a higher mass fraction, minimizes nozzle throat size, which, in turn, maximizes the nozzle expansion ratio within the motor length envelope, and minimizes insulation weight.

An igniter for such high performance rocket motors must be mounted on a forward portion of the propellant, thereby to provide the ignition source of heat as close as possible to the surface to be ignited. When so mounted, however, upon ignition of and burning of the propellant, the support for the igniter erodes. This tends to cause the igniter to become detached from the propellant and presents a problem of possible resultant damage to the rocket motor nozzle or the propellant. In order to avoid such damage, the igniter must be substantially consumed before becoming detached from the propellant. Additionally, the igniter must perform its intended function of igniting the propellant before it is consumed.

An igniter having especial utility in igniting solid fuel rocket motors having full, head-end webs is disclosed in U.S. Pat. No. 4,498,292 which was granted on Feb. 12, 1985 to C. Max White, one of the joint inventors of the present invention, and which is assigned to the same assignee. The igniter of the White U.S. Pat. No. 4,498,292 is consumable, wafer-like in appearance, and includes a hat-shaped or shallow cup-shaped urethane housing or container. The housing comprises a flat disk attached to one end of a short cylinder, a flange being attached to the other end for attachment of the igniter directly to the rocket motor propellant. A wafer or disk of high energy solid propellant is attached to the inside of the housing. The disk of solid propellant has holes formed therein and has radial grooves in the surface facing the rocket motor propellant for directing gases from the burning propellant through holes or exhaust ports that are provided in the peripheral surface of the cylinder. A liner of EPDM, a terpolmmer elastomer made from ethylene-propylene diene monomer elastomer, on the inside surface of the cylinder has holes that are in alignment with the holes in the cylinder but which, normally, are smaller. An igniter initiator having a tubular urethane housing is positioned adjacent the solid propellant disk. Upon ignition of the solid propellant disk, as the internal pressure within the combustion chamber of the igniter becomes greater, the holes in the liner expand, releasing the hot gases in smoothly increasing volume to provide rapid ignition of the rocket motor propellant before the igniter is consumed by combustion or becomes detached from the rocket motor propellant due to erosion of the latter.

While a qualified consumable wafer igniter and having especial utility for igniting solid fuel rocket motors having full head-end webs, the igniter of the White U.S. Pat. No. 4,498,292 has been found to experience non-acoustic instability phenomena as illustrated in FIG. 5 of the drawings. This phenomena is undesirable and renders the igniter marginal or unacceptable for some applications.

Thus, there is a need and a demand for improvement in consumable wafer igniters to the end of eliminating the aforementioned non-acoustic instability phenomena. The present invention was devised to fill the technological gap that has existed in the art in this respect.

SUMMARY OF THE INVENTION

An object of the invention is to provide an improved consumable wafer igniter which is capable of operation at significantly higher pressures and for significantly longer periods of time than the consumable wafer igniters of the prior art.

Another object of the invention is to provide such an improved consumable wafer igniter which is of substantially the same weight and bulk as the prior art consumable wafer igniters but which operates without experiencing the aforementioned non-acoustic instability phenomena to which the prior art consumable wafer igniters are subject.

In accomplishing these and other objectives of the invention, there is provided an improved wafer igniter which incorporates a fiberglass reinforcement in the urethane container, a dual rubber or other elastomer orifice arrangement in each of the plurality of exhaust ports, a shear key or lip for interlocking the igniter with the propellant grain of the rocket motor, and a saddle structure for facilitating retention of the initiator tube of the igniter.

In accordance with the invention, the fiberglass reinforcement for the urethane container is incorporated therein during the molding thereof. As a result, the fiberglass reinforced container comprises an integral structural unit of substantially the same bulk, with little increase in weight, but having significantly strengthened structurally.

The dual rubber orifice arrangement in each of the exhaust ports perform a function of retaining the gas pressure within the combustion chamber of the container, upon ignition of the propellant therein, to a first level at which the pressure is great enough to project flaming gases onto the surface of the rocket motor to effect ignition of the rocket motor propellant grain. Upon increase in the internal pressure within the container to a second and higher level, the exhaust ports expand additionally to release the flaming gases in a substantially increased volume over the rocket motor propellant grain, thereby providing increased assurance that ignition of the latter will occur.

The shear key or lip on the container for the igniter fits within a mating circular groove or cavity in the propellant grain of the rocket motor and effectively interlocks the container with the rocket motor solid propellant grain. This structurally strengthens the container so that there is no distortion, that is, bowing outwardly thereof, even at operation involving generated internal or chamber pressures significantly greater than those employed in the prior art consumable wafer igniters.

The saddle arrangement facilitates rigid retention of the initiator tube in the container even at relatively high gas generating pressures.

The improved igniter of the invention operates at approximately twice the operating pressure of the aforementioned prior art igniter, specifically, in one embodiment, at a pressure of 70 pounds per square inch absolute (psia) while burning approximately six times longer, that is, 1200 milliseconds vs. 200 milliseconds.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which the preferred embodiment of the invention is illustrated.

DESCRIPTION OF THE DRAWINGS

Having summarized the invention, a detailed description follows with reference being made to the accompanying drawings which form part of the specification, of which.

DESCRIPTION OF THE PREFERRED EMBODIMENT

Figure 1:
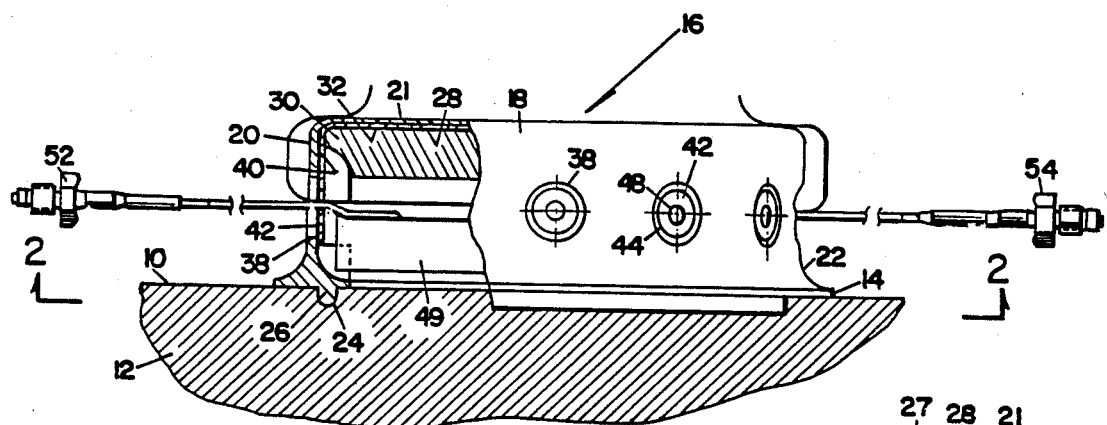
FIG. 1 is a fragmented cross sectional view of the aft end of a rocket motor full head-end web propellant grain showing the improved igniter of the present invention mounted on the aft end surface thereof.

Referring to FIG. 1 of the drawings, the numeral 10 designates the surface at the aft end of a full head-end propellant grain 12 of a rocket motor. Mounted on the surface 10 of the propellant grain 12 and attached thereto, as by a suitable adhesive 14, is a consumable wafer igniter 16 embodying the present invention.

The igniter 16 includes a thin, that is, a shallow circular, cup-shaped or hat-shaped, fiberglass reinforced, urethane housing or container 18. Container 18 includes a cylinder wall 20, an end wall 21, and a narrow mounting rim or flange 22 at the open end thereof. Flange 22 extends radially inwardly as well as radially outwardly of the container 18. Integral with an inwardly extending portion of the flange 22 and projecting into a circular groove or cavity 24 in the surface 10 of the propellant grain 12 is a circular shear key or lip 26. The shear key 26 mechanically interlocks the urethane container 18 with the propellant grain 12 of the rocket motor, the shear key 26 and the flange 22 being rigidly attached to the surface 10 of the propellant grain 12 by the adhesive 14.

A feature of the urethane container 18 is that it is reinforced with fiberglass. That is to say, the fiberglass reinforcement material is integrally formed with the urethane material. Specifically, prior to molding, fiberglass cloth is formed with uniform arrangement of the urethane material. Both are subjected during the molding process to heat and pressure in a manner known to those skilled in the art.

Bonded to a surface 27 of the end wall 21 of the container 18 is a circular piece of EPDM rubber insulator 28. A flat circular piece or disk of solid propellant 30 is partially bonded, as by a suitable resin 32 to the EPDM rubber insulator 28. For sustaining ignition in a vacuum (high altitude) environment, the material of which the solid propellant disk 30 is made preferably is a high energy propellant having a rapid burning rate. A composition having particular utility for the purpose is that disclosed and claimed in U.S. Pat. No. 4,658,578 granted on Apr. 21, 1987 to Graham Shaw and assigned to the assignees of the present invention.

A plurality of holes 34 are formed in the propellant 30 to produce the required burning surface to support a specific mass flow rate. Radial grooves 36 are provided in the surface of the propellant 30 that faces in the direction of the rocket motor propellant grain 12 to direct flaming gases from the burning propellant grain 30 through exhaust ports 38 in the cylindrical portion 20 of the container 18.

The inner surface 40 of the cylindrical wall 20 is lined with a sheet 42 of EPDM. Sheet 42 has holes 44 therein that are in alignment with the centers of exhaust ports 38 in the cylindrical wall 20, the exhaust ports 38 being substantially larger than the holes 44, as best seen in FIG. 1. Also lining the inner surface 40 of the cylindrical wall 20 of the container 18 underlying the EPDM sheet 42, is a second sheet, designated 46, of EPDM having holes 48 therein that are in alignment with the centers of the exhaust ports 38 and the holes 44 in sheet 42. The holes 48 in sheet 46 are smaller than the holes 44 in the sheet 42. The radial grooves 36 desirably have a depth of about one-half the thickness of propellant disk 30 to preclude blocking gas flow through the holes 44 and 48 and the exhaust ports 38. The smaller holes 48 in the sheet 46 may have a diameter of ¼ inch, for example, and perform the function of retaining the gas pressure within the housing 18 to sustain burning in a vacuum environment until the combustion chamber pressure within container 18 is sufficiently great to project flaming gases onto the surface of the rocket propellant 12 over the required area. As the chamber pressure becomes greater, the holes 48 in the sheet 46 expand, releasing the flaming gases in greater volume. For facilitating bleed-off from the top of the burning propellant disk 30, a large center hole 45 is provided therein, as shown.

The relatively smaller holes 48 in the sheet 46 perform a function of retaining the gas pressure within the container 18, upon ignition of the propellant disk 30, until at a first level of operation, the pressure within container 18 is great enough to project flaming gases through the exhaust ports 38 onto the surface 10 of the rocket motor propellant grain 12 over a required area. Pre-release of flaming gases initially is in the nature of an impulse at a relatively low flow volume. With continued burning of the solid propellant disk 30, however, the pressure within the container 18 continues to rise, until at a second level of operation, there is further expansion of the holes 48 in the EPDM sheet 46 as well as further expansion of the holes 44 in the EPDM sheet 42 that results in an increased flow of flaming gases through the exhaust ports 38 onto the surface 10 of the rocket motor propellant grain.

Figure 3:
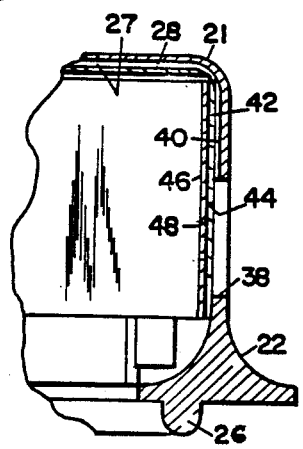
FIG. 3 is a fragmented cross sectional view on an enlarged scale of the housing for the igniter showing several sheets lining the inside wall thereof.
Figure 2:
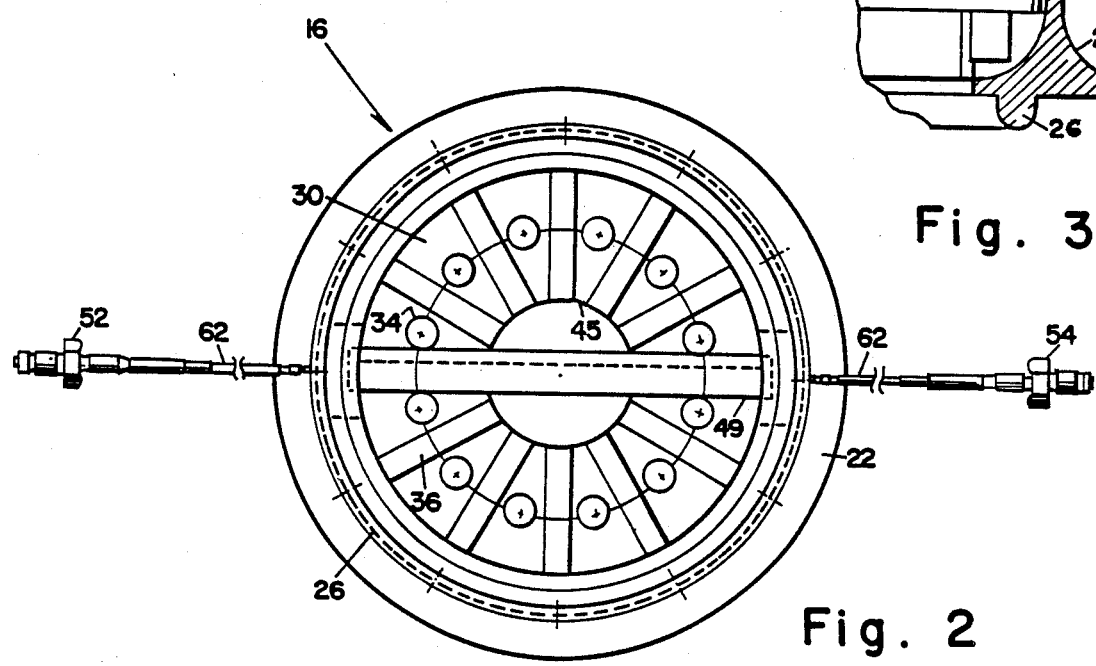
FIG. 2 is a view of the improved consumable wafer igniter taken along the lines 2—2 of FIG. 1.
Figure 4:
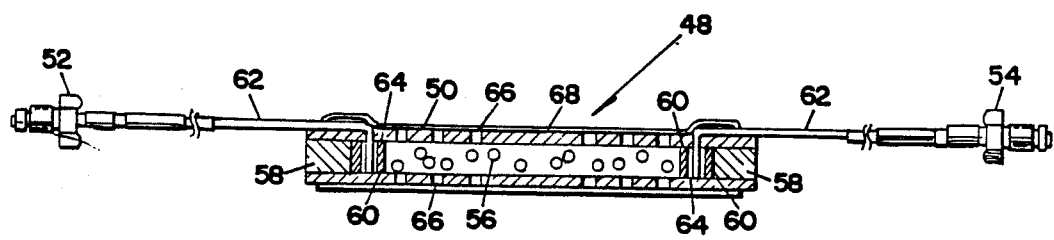
FIG. 4 is a cross sectional view of the initiator of the igniter.

An initiator tube 49 retained in a saddle structure provided at each end thereof, as indicated in FIGS. 1 and 3, is provided for activating the consumable wafer igniter 16. Initiator tube 49 comprises a perforated tubular urethane housing 50 that is filled with pellets 56 which are made of a mixture of boron and potassium nitrate. Each end of tube 50 is sealed with a plug of epoxy resin 58 that confines a pair of styrofoam disks 60. Sandwiched between each pair of styrofoam disks 60 is the end of an Ignition Propagation Cord assembly (IPC) 62 surrounded by a mixture 64 of boron and potassium nitrate in powder form. The IPC is a product of Teledyne McCormick-Selth, 3601 Union Road, P. 0. Box 6, Hollister, California and comprises a rapidly burning material that is encased in a lead sheath having a polyethylene jacket. Each fuze 62 has igniting connections, 52 and 54, respectively, to an ordnance initiator (not shown) that is attached to the case (not shown) of the rocket motor.

When it is desired to ignite the igniter 16 which is attached to rocket motor propellant 12, ordnance initiators (not shown) are fired by an externally initiated, confined detonating fuze (not shown). This ignites the IPC assembly 62, which in turn ignites the associated boron and potassium nitrate powder mixture 64. This produces hot gases that break through the inner styrofoam disk of each pair of disks 60 to ignite the pellets 56 within the initiator tube 50. The resulting flaming gases are discharged through a row of holes 66 in the tube 50. The holes 66 in tube 50 are normally covered with aluminum tape 68 which contains the gas pressure within the tube 50 until the gas pressure is sufficiently high to ignite the propellant 30 effectively. The resulting gases are then forced through the orifices 38, 44 and 48 in the container 18 to ignite the rocket motor propellant 12. The consumable wafer igniter 16 is then consumed by combustion of the propellant grain 12 before the propellant grain 12, at the location of attachment of the igniter 16 thereto, becomes so eroded that the igniter 16 is no longer supported thereby and becomes detached therefrom.

Figure 5:
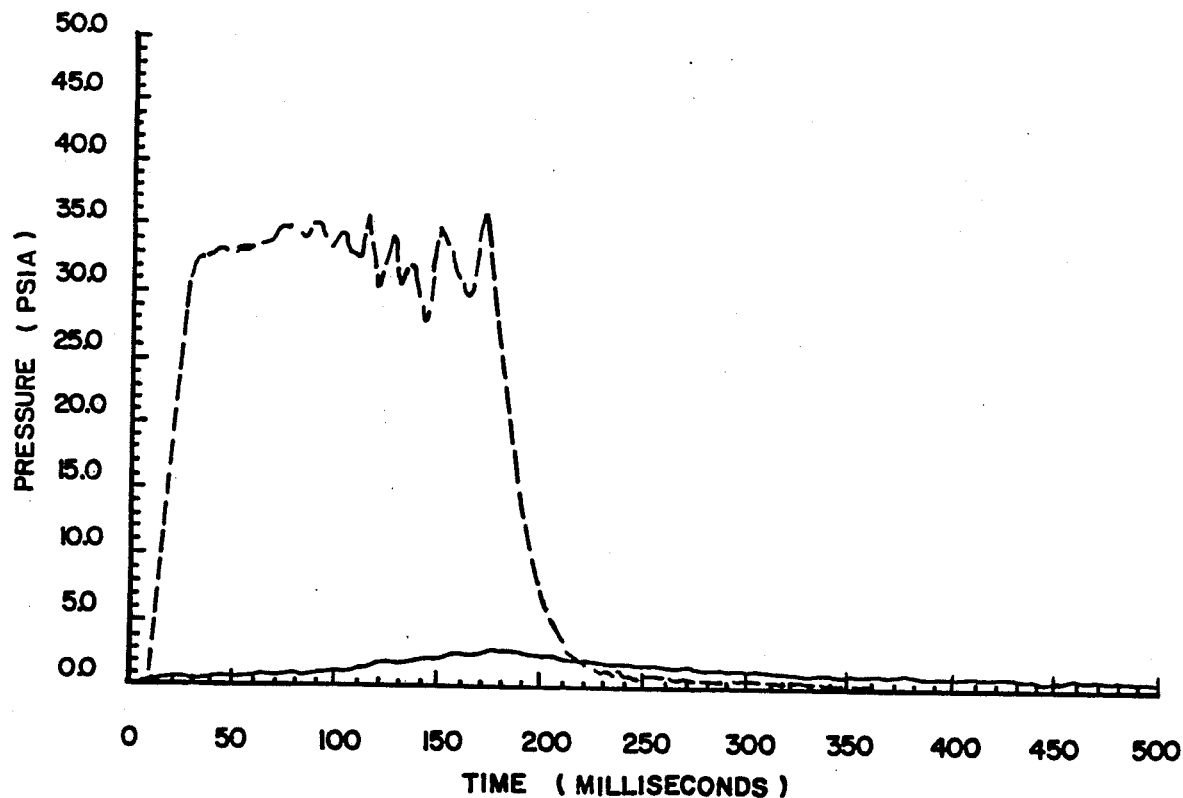
FIG. 5 is a graph illustrating the pressure/time trace of the consumable wafer igniter of the prior art.
Figure 6:
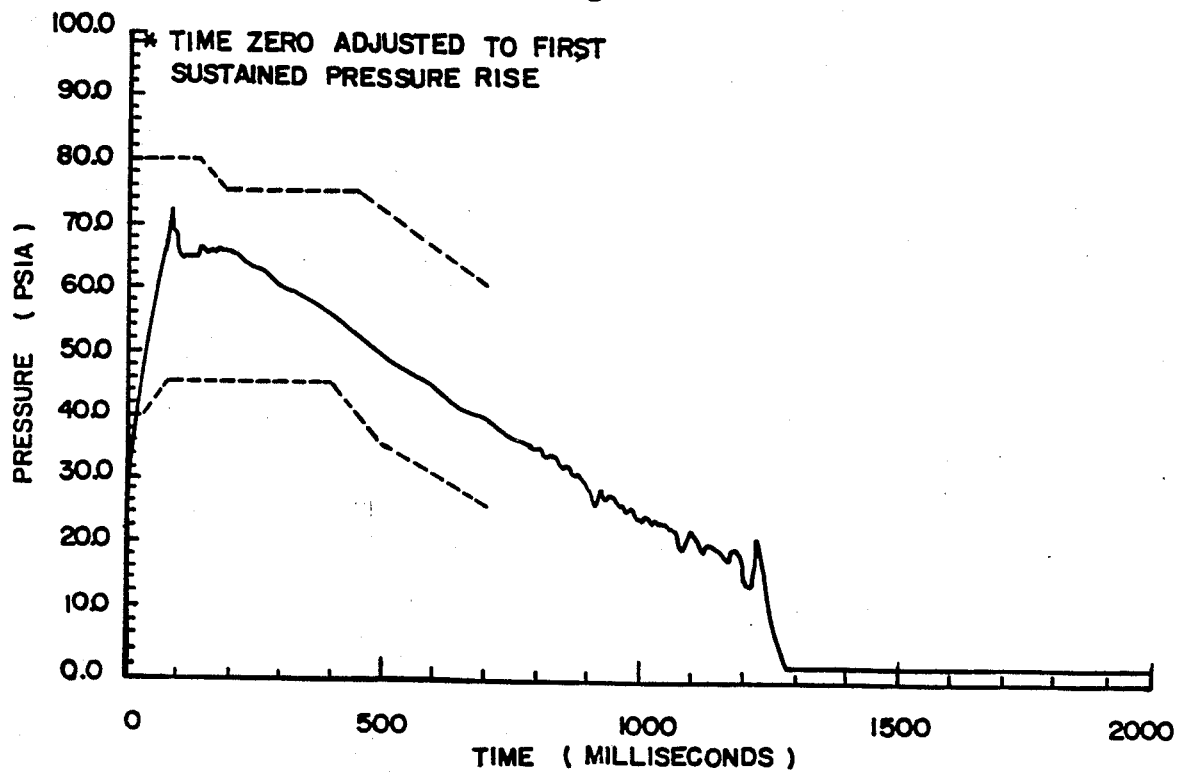
FIG. 6 is a graph illustrating the pressure/time trace of the improved consumable wafer igniter according to the present invention.

Graphs illustrating the igniter chamber pressure of the aforementioned prior art consumable wafer igniter and the improved consumable wafer igniter of the present invention are shown in FIGS. 5 and 6, respectively. In FIG. 5 it will be seen that the operating chamber pressure of the prior art consumable wafer igniter was about 35 psia and that it experienced instability phenomena at approximately 180 milliseconds after igniter ignition. FIG. 6 shows the improved consumable wafer igniter of the invention to have an operating pressure of about 70 psia, to be devoid of the undesired instability phenomena for approximately 1200 milliseconds, and to burn about six times as long.

Thus, there has been provided, according to the invention, an improved consumable wafer-like igniter having especial utility in igniting high-performance rocket motors having a full head-end web. The igniter is characterized in its operation at increased chamber pressure, in its release of flaming gases for igniting the rocket motor propellant in two discrete levels of volume flow, and with the release of the flaming gases being as close as possible to the surface to be ignited, thereby to provide rapid, reliable and robust ignition of the rocket motor propellant before being consumed by combustion of the rocket motor propellant and before being detached therefrom.

With this description of the invention in detail, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the scope of the appended claims.

What is claimed is:

1. A consumable wafer igniter for a rocket motor comprising a cup-shaped container having an open end, an inner end wall and a cylindrical wall with a flange on said open end for attachment to the surface of the propellant of the rocket motor to define the igniter gas generating chamber, said cylindrical wall having a plurality of peripherally spaced exhaust ports therein, the inner surface of said cylindrical wall being lined with at least one layer of elastomer liner having holes therein in alignment with the exhaust ports in said cylindrical wall, a flat propellant disk positioned in said chamber adjacent said inner end wall of said container, said propellant disk having a plurality of holes therein for adjustment of the mass flow gas rate and having radial grooves on a surface thereof to direct the burning propellant gases through the aligned holes and exhaust ports in said liner and said cylindrical wall, and means to ignite said propellant disk, said flange having a circular key thereon extending in a direction parallel to said cylindrical wall and adapted to extend into a mating circular cavity provided on the surface of the rocket motor propellant for interlocking said container and said rocket motor propellant thereby to reduce a tendency for bowing outwardly of said cylindrical wall upon increase in pressure of generated gas in said chamber.

2. A consumable wafer igniter as defined by claim 1 wherein said flange includes a portion that extends radially inwardly with respect to said cylindrical wall, and said circular key is positioned on said radially inwardly extending portion.

3. A consumable wafer igniter as defined by claim 1 wherein said container is made of fiberglass reinforced urethane.

4. A consumable wafer igniter as defined by claim 1 wherein said means to ignite said propellant disk comprises a tubular housing positioned adjacent said surface of said propellant disk, said tubular housing being filled with pellets made of boron and potassium nitrate, each end of said tubular housing being sealed with a plug of epoxy resin that confines a pair of styrofoam disks, a fuze and boron and potassium nitrate in powder form being sandwiched between each pair of styrofoam disks, and means for connecting each fuze to an ordnance initiator, said tubular housing being supported in said chamber in said container by a saddle at each end thereof with each of said saddles being rigidly attached to the inner surface of said cylindrical wall.

5. A consumable wafer igniter as defined by claim 4 wherein said saddles are attached to the inner surface of said cylindrical wall at substantially diametrically opposites sides of said container.

6. A consumable wafer igniter as defined by claim 1 wherein the holes in said elastomer liner are normally smaller than the exhaust ports in said cylindrical wall whereby upon burning of said propellant disk the smaller holes in said liner retain the gas pressure within said chamber until the gas pressure is sufficiently great to project flaming gases through said aligned peripheral exhaust ports.

7. A consumable water igniter as defined by claim 6 further including a second layer of elastomer liner lining the inner surface of said cylindrical wall, said second layer having holes therein in alignment with the holes in said first layer of elastomer and the exhaust ports in said cylindrical wall, said holes in said second layer of elastomer liner being normally larger than the holes in said first layer of elastomer liner whereby upon burning of said propellant disk the smaller holes in said first layer of elastomer liner retain the gas pressure within said chamber until the gas pressure is sufficiently great to project flaming gases through said aligned peripheral exhaust ports at a first volume level with the holes in said second layer of elastomer liner limiting the gas flow to the first volume level until the gas pressure in said chamber is sufficiently great to project flaming gases through said aligned peripheral exhaust ports at a second volume level that is larger than said first volume level.

* * * * *